Aug. 17, 1965 M. A. RICKARDS 3,200,634
DYNAMIC TEST FACILITY
Filed Dec. 1, 1961 2 Sheets-Sheet 1
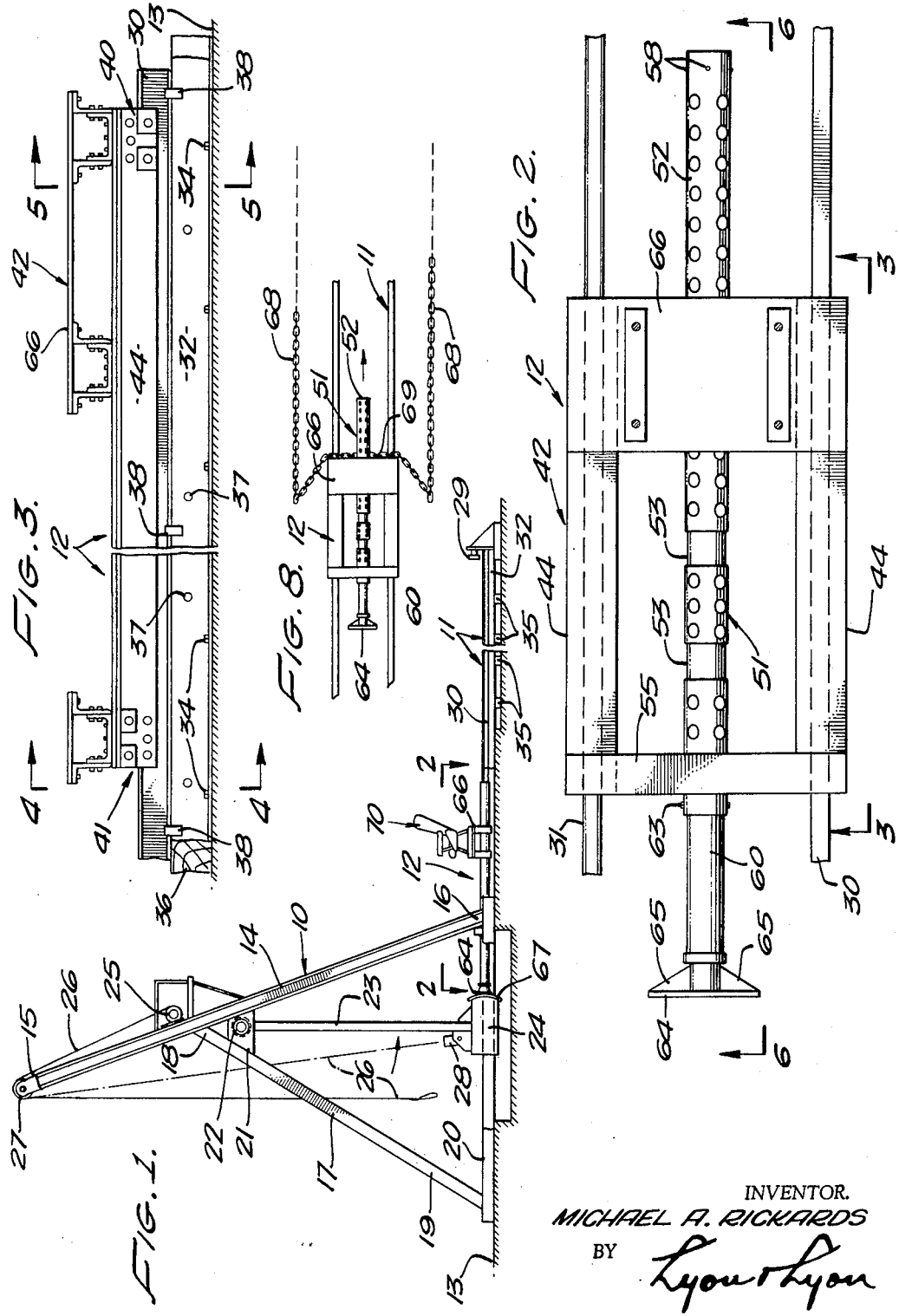
INVENTOR.
MICHAEL A. RICKARDS
BY Lyon & Lyon
ATTORNEYS

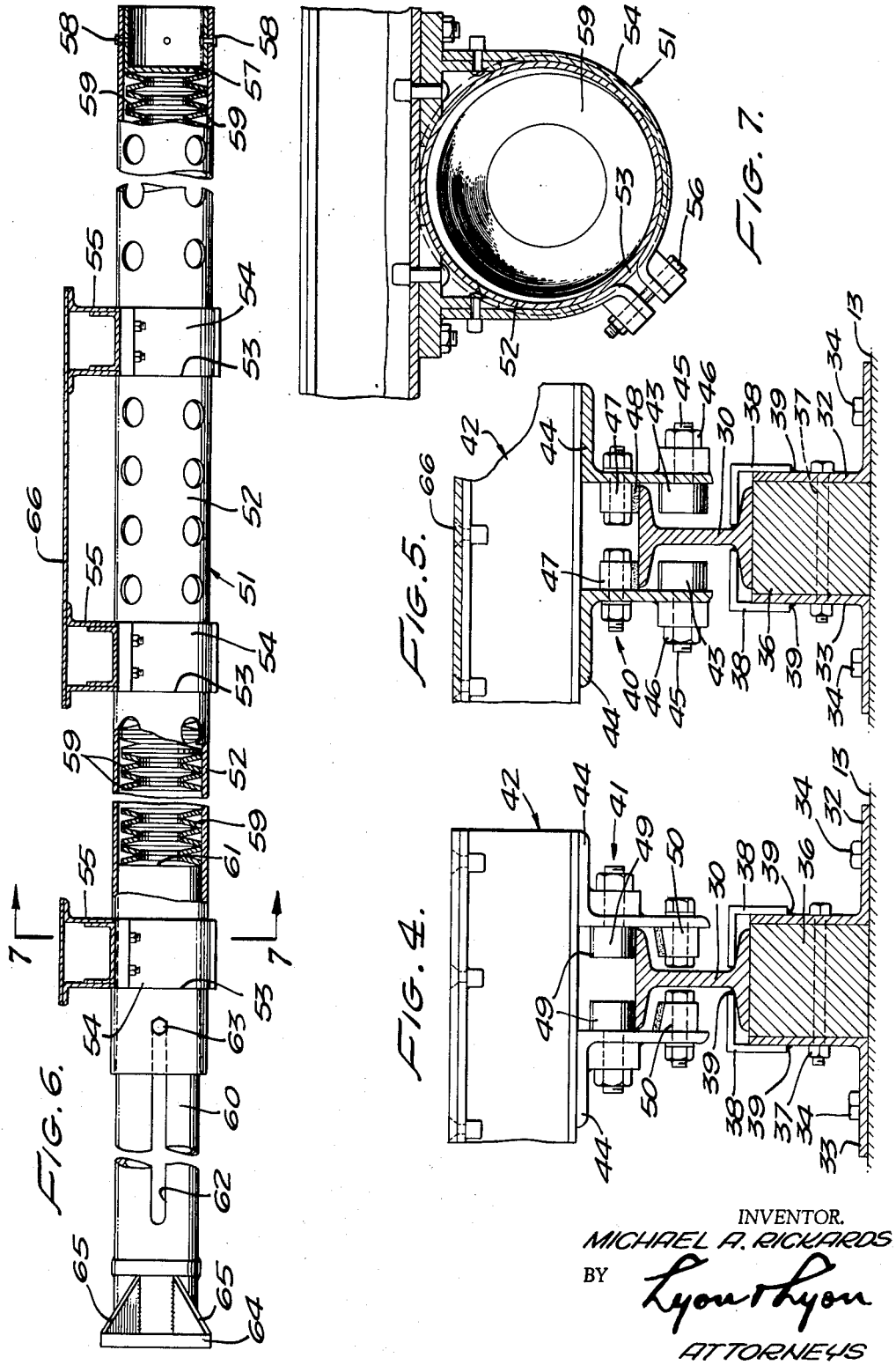

United States Patent Office 3,200,634
Patented Aug. 17, 1965

3,200,634
DYNAMIC TEST FACILITY
Michael A. Rickards, Studio City, Calif., assignor to Weber Aircraft Corporation, Burbank, Calif., a corporation of California
Filed Dec. 1, 1961, Ser. No. 156,418
19 Claims. (Cl. 73—12)

This invention relates to a dynamic test facility for testing various specimens and apparatus and, in particular, is directed to a test facility for simulating the rapid deceleration encountered in crash conditions of an airplane or other vehicle.

In numerous situations, the specifications and requirements of apparatus demand that the apparatus be so constructed as to be able to withstand the forces involved in a crash of the moving vehicle in which the apparatus is mounted without destruction of the particular apparatus. Although theoretical engineering and design may dictate a structure which in theory would withstand a crash condition, it is often highly beneficial to simulate the crash condition in order to refine the structural requirements of the apparatus. Further, there are certain situations where part of the specific requirements of a particular apparatus is that the apparatus be able to withstand a specified crash condition.

As an example, an airplane seat and the seat belts must be able to sufficiently withstand the forces involved in the crash landing of the airplane so that the occupant remains in the seat, the seat remains secured to the airplane and the seat is sufficiently undeformed so as to not injure the occupant. Although in most instances it is impractical, if not impossible, to construct a seat that will withstand a crash at all velocities obtainable by the airplane, it has been found desirable to be able to rate the strength of the seat by the crash forces which it is able to withstand. Thus, a dynamic testing facility should be relatively versatile so that various crash conditions may be simulated. Further, the testing facility should be adapted to test apparatus varying in size and weight.

It is therefore an object of this invention to provide a dynamic testing facility wherein novel means are provided for simulating the deceleration forces which would be encountered by a specimen in an actual crash condition.

Another object of this invention is to provide a novel form of dynamic testing facility wherein the apparatus provided may be readily adjusted to simulate various crash conditions for various types and sizes of apparatus.

A further object of this invention is to provide a novel form of dynamic testing facility wherein rapid acceleration may be imparted to the specimen to simulate the rapid deceleration encountered in a crash condition.

Another and more specific object of this invention is to provide a novel form of force converting or transmuting device for use with a dynamic testing facility wherein the force of a relatively sharp impact is converted into relatively continuing forces of acceleration.

Other and more detailed objects and advantages of this invention will appear from the following description of the accompanying drawings:

In the drawings:

FIGURE 1 is an elevational view of the apparatus of this invention with portions broken away due to size consideration and for clarity of illustration.

FIGURE 2 is a fragmentary sectional plan view of the test sled taken substantially on the line 2—2 as shown in FIGURE 1.

FIGURE 3 is a fragmentary sectional elevation view of the test sled taken substantially on the line 3—3 as shown in FIGURE 2.

FIGURE 4 is a fragmentary sectional elevation view taken substantially on the line 4—4 as shown in FIGURE 3.

FIGURE 5 is a fragmentary sectional elevation view taken substantially on the line 5—5 as shown in FIGURE 3.

FIGURE 6 is a sectional elevation view taken substantially on the line 6—6 as shown in FIGURE 2.

FIGURE 7 is a fragmentary sectional elevation view taken substantially on the line 7—7 as shown in FIGURE 6.

FIGURE 8 is a plan view of the run-out track portion of the apparatus with the test sled in motion as during an actual test.

Referring now to the drawings, the apparatus of this invention is generally comprised of a frame and pendulum assembly 10, a run-out track assembly 11, and a sled assembly 12. The frame and pendulum assembly 10 and the run-out track assembly 11 may be mounted on the ground 13 and structurally connected to each other by any convenient means to assure proper alignment therebetween and eliminate relative movement between the frame and the track. The sled assembly 12 is mounted for movement along the runout track assembly 11, as hereinafter described.

Means are provided for imparting forces to the test assembly 12 for accomplishing the dynamic testing and as shown in the drawings, these means may include the frame and pendulum assembly 10. The assembly 10 may be comprised of a pair of frame members 14 (one of which is positioned directly behind the other as viewed in FIGURE 1), which are joined at their upper ends 15 and have their lower ends 16 relatively separated, thus forming what is commonly known as an "A-frame." A pair of brace members 17 (one of which is positioned directly behind the other as viewed in FIGURE 1) are provided and each has its upper end 18 secured to one of the members 14 and its lower end 19 relatively separated from the lower end 19 of the other brace member 17. The lower ends 16 and 19 of the members 14 and 17 are all secured to a base frame 20. A support bracket 21 extends from each frame member 14 to the connected brace member 17 and serves to support a shaft 22 extending between and mounted on the two support members 21.

The means for imparting forces to the sled assembly may be in the form of a weighted plendulum assembly and, as shown in the drawings, this assembly may be comprised of a pendulum arm 23 pivotally mounted at one end to the shaft 22 in such a manner that the arm 23 may pivot in only a substantially vertical plane. The other end of pendulum arm 23 may be secured to a weighted member 24 which is of a predetermined weight sufficient to impart the necessary forces to the sled assembly 12. A hoist 25 of conventional design and having a cable 26 which extends over a pulley 27 rotatably mounted on the upper ends 15 of the members 14 may be used to rotate the pendulum assembly about the shaft 22 in order to raise the weighted member 24 to the desired height. The cable 26 may be connected to the weighted member 24 by a quick release mechanism 28 of conventional design so that the hoist 25 through cable 26 lifts the weighted member 24, rotating the pendulum assembly in a clockwise direction from the position shown in FIGURE 1 to any desired height of the weighted member 24 which will impart the desired forces to the sled assembly 12. The quick release mechanism 28 is operated to allow the pendulum assembly to swing free from the cable 26, rotating in a counterclockwise direction to strike the sled assembly 12 and impart the desired forces to the sled. While a particular frame and pendulum assembly design has been described, it is to be understood that the specific features of construction may be varied without deviating from my invention.

The run-out track assembly 11 is provided for carrying the sled assembly 12 and is of sufficient length to permit the acceleration and deceleration of the sled assembly 12. A bumper stop 29 is provided on the end of the run-out track assembly remote from the frame and pendulum assembly 10 in order to prevent inadvertent travel of the sled assembly 12 beyond the end of the run-out track. The run-out track assembly 11 is comprised of a pair of rails 30 and 31 positioned substantially parallel to each other and horizontal. The rails are mounted on the ground by means of a pair of angle irons 32 and 33 secured directly to the ground by any convenient means such as lag bolts 34 and levelled by means of ties 35 where appropriate. A support block 36 is positioned between the upright legs of the angle iron members 32 and 33 and is secured therebetween by bolts 37. A plurality of hold-down members 38 are provided along the rails and are secured to the rail and angle iron members 32 and 33 by any convenient means such as weld 39. Although it is not essential to this invention, I prefer to construct the support 36 of wood in order to absorb some of the vertical shock loading imparted by the sled assembly 12 to the rails 30 and 31.

The sled assembly 12 is mounted on the rails 30 and 31 by means of a leading mounting assembly 40 and a trailing mounting assembly 41 encircling the upper flange of each of the I-beam shaped rails 30 and 31. The leading mounting assembly 40 is mounted on that end of the frame 42 of the sled assembly 12 which is more remote from the frame and pendulum assembly 10 and closer to the bumper stop 29. The trailing mounting assembly 41 is mounted on the opposite end of the frame 42 and which is the trailing end of the frame 42 during the movement of the sled assembly along the track during a dynamic test. Each of the leading mounting assemblies 40 is provided with a pair of rollers 43 rotatably mounted on longitudinal frame members 44 of the frame 42 and which are positioned beneath the upper flange of the rails so that upon upward movement of the leading end of the frame 42 the rollers 43 engage the underside of the rail flange to limit the upward movement of the frame, but permit rolling movement of the frame relative to the rails. The rollers 43 may be of conventional design such as cam followers having threaded posts 45 which may be secured to the support member by a nut 46. A pair of brake shoes 47 are mounted on the longitudinal frame members 44 above the upper flange of the rails 30 and 31, and have lower surfaces 48 comprised of any conventional brake shoe material for engaging the upper surface of the rails to aid in the stopping of the sled assembly 12. In addition to the brake shoes, means are provided for decelerating the test sled from high velocities and, as shown in FIGURE 8, these means may be comprised of a heavy drag chain 68 forming a momentum brake. The chain 68 crosses the run-out track assembly 11, midspan 69 of the chain span at a predetermined point along the track and the chain's halfspans are laid parallel to the track and along the direction of sled motion. When the sled travels down the track, the sled picks up the drag chain and carries with it a progressively higher chain mass. This increase in the moving mass of the combined sled and drag chain for substantially the same momentum of the combination induces the high decelerating force when the sled velocity is high, whereas friction at high velocity is low. As the sled slows down the momentum effect becomes smaller but more chain is being dragged on the ground and friction is increased. The resultant effect is an almost constant deceleration of the sled throughout the span of the track regardless of sled velocity.

The railing mounting assembly 41 is provided with rollers 49 and brake shoes 50 which, like rollers 43 and brake shoes 47, respectively, of the leading mounting assembly, are mounted on the longitudinal frame members 44, but differ therefrom in that the rollers 49 are mounted above the upper flange of the rails 30 and 31, and the brake shoes 50 are mounted below that flange.

The leading and trailing mounting assemblies 40 and 41, respectively, have their components arranged as described so that the rollers 43 and 49 engage the rails 30 and 31 upon acceleration of the sled assembly due to the impact of the weighted member 24 and so that the brake shoes 47 and 50 engage the rails at the termination of acceleration to cause deceleration of the sled assembly as it progresses down the run-out track assembly 11 toward the bumper stop 29. This specific relation of engagement of rollers or shoes is a result of the overall design of the sled assembly 12 in that the point of impact between the weighted member 24 and the sled assembly is below the center of gravity of the sled assembly. Thus, as viewed in FIGURE 1, as the weighted member 24 strikes the sled assembly 12 and tends to urge the sled assembly to the right, it also tends to cause the sled assembly to turn in a counterclockwise direction for a very small angle until the rollers 43 of the leading mounting assembly 40 engage the underside of the rails, and this counterclockwise turning force is applied throughout the acceleration of the sled assembly as a result of the forces imparted by the weighted member 24 as hereinafter described.

The rollers 49 of the trailing mounting assembly 41 engage the rails by virtue of gravitational forces as well as the counterclockwise rotational forces present during the acceleration. When the accelerating forces imparted by weighted member 24 are eliminated, the gravitational and friction forces cause the leading end of the frame 42 to drop so that the brake shoes 47 of the leading mounting assemblies engage the upper surface of the rails to cause deceleration of the sled assembly 12. The brake lining surface 48 of the brake shoes 47 is below the center of gravity of the sled assembly and therefore the engagement of those surfaces 48 with the rails causes clockwise turning of the sled assembly 12 through a very small angle until the brake shoes 50 of the trailing mounting assembly engage the lower side of the upper flange of the rails to aid in the deceleration of the sled assembly.

Means are provided for transmuting the kinetic energy developed by the swinging of the weighted member 24 into a relatively continuing and uniformly increasing and decreasing acceleration pulse applied to the sled assembly 12. As shown in the drawings, these means may be comprised of the impact transmuting assembly, generally designated 51. A cylindrical housing 52 of the impact transmuting assembly 51 is provided with external annular recessed portions 53 adapted to receive the clamp assemblies 54 for securing the housing 52 to the lateral frame members 55 of the sled frame 42. The clamp assemblies 54 have tensioning bolts 56 for securing the body of the clamp assembly tightly in the annular groove 53 on the cylindrical housing. A plug 57 is mounted in one end of the housing 52 by any convenient means such as lock bolts 58. A plurality of spring washers 59 of a generally frusto-conical shape are positioned in the housing 52. The washers 59 have an outside diameter slightly less than the inside diameter of the housing 52 and are positioned so that their axes are generally aligned with the axis of the housing. These frusto-conical spring washers 59 are of the type commonly known as "Belleville" washers or springs, and may be positioned with the large end of each contacting the large end of one adjacent washer and the small end of each contacting the small end of the other adjacent washer (as shown), or in nesting relationship involving a given group of washers oriented in the same direction (not shown), or any combination of these two manners of positioning. When some of the spring washers 59 are positioned in nesting relationship, the force required to compress the washers is accordingly greater for the linear amount of compression depending on the number of washers in nesting relationship than when the spring washers 59 are all positioned as illustrated in FIGURE 6.

A generally cylindrical plunger 60 is mounted in the open end of the housing 52 and has one end 61 engaging the Belleville washers 59. The plunger 60 has a slot 62 for receiving a guide bolt 63 which is secured to and passes through the housing 52 so that the plunger 60 cannot be extracted from the housing without removal of the guide bolts 63. The guide bolts 63 and slots 62 also collaborate to limit turning movement of the plunger 60 relative to the housing 52. The protruding end of the plunger 60 is provided with an impact plate 64 secured and braced to the plunger by angle braces 65 welded to the plunger and the impact plate.

In the operation of this dynamic testing facility, the specimen to be tested such as the seat 70 is mounted on the platform 66 of the sled frame 42. The pendulum arm 23 is pivoted about the shaft 22 by raising the weighted member 24 with the cable 26 and hoist 25, as heretofore described, to the predetermined height necessary to impart the desired forces to the sled assembly. The sled assembly 12 is positioned on the track so that the impact plate 64 will engage the curved nose plate 67 of the weighted member 24 when the weighted member and pendulum arm 23 are released and allowed to swing downwardly. For consistency in testing I prefer to always position the sled so that maximum deflection of plunger 60 occurs when the pendulum arm 23 is vertical. This involves a plurality of optimum sled positions dependent on test conditions. Various known instrumentation may be installed on the specimen 70 and the sled assembly for data read-out or recording as desired. The weighted member 24 is released by the quick release mechanism 28 and swings downwardly so that the nose plate 67 strikes the impact plate 64 forcing the plunger 60 into the housing 52 and compressing the spring washers 59. Upon the first instant of impact the resistance to compression of the spring washers 59 causes the sled assembly 12 to begin to move and accelerate from left to right as viewed in FIGURE 1. However, the weight of the sled assembly 12 resists the instantaneous acceleration of the assembly to the same velocity as the weighted member 24 and therefore the weighted member 24 serves to urge the plunger 60 further into the housing 52 thereby further compressing the spring washers 59. With the impact plate 64 still engaging the nose plate 67, the forces imparted through the washers 59 sufficiently accelerate the sled assembly 12 (and as a consequence, decelerate the weighted member 24) so that the weighted member and sled assembly attain a condition where they have the same velocity. After this condition of identical velocities has been attained, the spring washers 59 urge the plunger 60 out of the housing 52 while the impact plate 64 still engages the nose plate 67 thereby serving to further accelerate the sled assembly 12, this latter stage of acceleration being relative to both the track and the weighted member. When the plunger 60 reaches its outermost position as stopped by the guide bolt 63, the sled assembly 12 will have a velocity greater than the weighted member 24 and therefore the impact plate 64 will part from the nose plate 67. Since no further accelerating forces are being applied to the sled assembly 12, it will begin to decelerate, as heretofore described, by the operation of the drag chain momentum brake and the friction brakes of the leading and trailing mounting assemblies 40 and 41, respectively.

Since the spring washers 59 have finite mass, an internal spring oscillation of various modes is excited and is additive to the pure half-sine wave imparted by the nose plate 67. The spring 59 mass and stiffness relationship is such that the sled experiences a modulated acceleration pulse similar to that experienced from a crash.

The distance of travel of the sled assembly 12 during the in and out movement of the plunger 60 serving to compress and expand the washers 59 will depend upon a number of factors including, but not limited to, the height to which the weighted member 24 is raised, the total weight of the sled assembly 12 including the specimen 70, and the quantity and orientation of the spring washers 59. For example, nesting orientation of the spring washers 59 would require greater force to compress the washers than if they were oriented as shown in FIGURE 6, and therefor greater force would be imparted to the sled assembly 12 for less movement of the plunger 60 resulting in a more rapid acceleration of the sled assembly and, in turn, a shorter distance of acceleration.

The rapid acceleration of the sled assembly from left to right as viewed in FIGURE 1 simulates a crash condition of rapid deceleration which would be encountered by a vehicle moving from right to left as viewed in FIGURE 1. The deceleration of the sled assembly as it progresses from left to right as viewed in FIGURE 1 is of such a rate, due to the length of the run-out track assembly 11, that the specimen is not subjected to sufficient forces in this deceleration to alter the results obtained by the rapid acceleration. Thus it may be seen that the apparatus of my invention may be adjusted and operated to simulate conditions of rapid deceleration as in a crash condition or rapid acceleration as in a catapulting condition. Further, by employing means for providing large deceleration forces during sled motion on run-out track 11, the facility is capable of providing reversed acceleration pulses in succession when it is desirable to simulate such a condition.

Having fully described my invention, it is to be understood that I do not wish to be limited to the details herein set forth or to the details illustrated in the drawings, but my invention is of the full scope of the appended claims.

I claim:

1. In a dynamic testing apparatus for rapidly accelerating a specimen to be tested, the combination of: mounting means for supporting said specimen, means for supporting said mounting means for movement thereon, impact-transmuting means mounted on said mounting means for receiving an impact force and having means for converting said force into a relatively sustaining force for accelerating said mounting means and said specimen, and means for generating an impact force and applying the same directly to said impact-transmuting means without directly engaging said specimen.

2. In a dynamic testing apparatus for rapidly accelerating a specimen to be tested, the combination of: a frame, a pendulum member pivotally mounted on said frame, means for pivotally raising and releasing said pendulum member, a sled for mounting the specimen, means for supporting said sled, impact-transmuting means mounted on said sled for positioning in the path of said pendulum member whereby said pendulum strikes said impact-transmuting means up release, said impact-transmuting means having means for converting the impact force generated by the striking by said pendulum member into a relatively sustaining force for accelerating the said sled and specimen.

3. In a dynamic testing apparatus for rapidly accelerating a specimen to be tested, the combination of: a frame, a pendulum member pivotally mounted on said frame, means for pivotally raising and releasing said pendulum member, a sled for mounting the specimen, a track for carrying said sled, impact-transmuting means mounted on said sled for positioning in the path of said pendulum member whereby said pendulum strikes said impact-transmuting means upon release, said impact-transmuting means having means for converting the impact force generated by the striking by said pendulum member into a relatively sustaining force for accelerating the said sled and specimen along said track.

4. In a dynamic testing apparatus for rapidly accelerating a specimen to simulate rapid acceleration or deceleration, the combination of: a frame, a pendulum arm having one end pivotally mounted on said frame for turning in a substantially vertical plane, a weighted member mounted on the other end of said arm, means for raising and releasing said arm to allow said arm and weighted member to swing downwardly, track means adjacent said frame and having the longitudinal axis parallel to the said plane of turning of said arm, a sled mounted for movement along said track means, said sled for carrying the specimen, impact-transmuting means mounted on said sled for positioning in the path of said weighted member upon turning of said arm, said impact-transmuting means having means for converting the impact force generated by the striking by said pendulum member into a relatively sustaining force for accelerating the said sled and specimen along said track.

5. In a dynamic testing apparatus for rapidly accelerating a specimen to simulate rapid acceleration or deceleration, the combination of: a frame, a pendulum arm having one end pivotally mounted on said frame for turning in a substantially vertical plane, a weighted member mounted on the other end of said arm, hoist means mounted on said frame for pivoting said arm to raise said weighted member, said hoist means having means for releasing said arm to allow said arm and weighted member to swing downwardly, track means adjacent said frame and having the longitudinal axis parallel to the said plane of turning of said arm, a sled mounted for movement along said track means, said sled for carrying the specimen, impact-transmuting means mounted on said sled for positioning in the path of said weighted member upon turning of said arm, said impact-transmuting means having means for converting the impact force generated by the striking by said pendulum member into a relatively sustaining force for accelerating the said sled and specimen along said track.

6. In a dynamic testing apparatus for rapidly accelerating a specimen to simulate rapid acceleration or deceleration, the combination of: a frame, a pendulum arm having one end pivotally mounted on said frame for turning in a substantially vertical plane, a weighted member mounted on the other end of said arm, means for raising and releasing said arm to allow said arm and weighted member to swing downwardly, track means adjacent said frame and having the longitudinal axis parallel to the said plane of turning of said arm, a sled mounted for movement along said track means, said sled for carrying the specimen, impact-transmuting means mounted on said sled and having a plunger for extending into the path of said weighted member upon turning of said arm, said impact-transmuting means having a cylindrical housing for slidably receiving said plunger, and a plurality of Belleville washers positioned in said housing for resiliently resisting the sliding of said plunger into said housing, whereby when the weighted member and arm is raised and released by said hoist means the said weighted member strikes said plunger urging said plunger into said housing to compress said Belleville washers and with said plunger still engaging said weighted member, the Belleville washers expand to progressively urge said plunger out of said housing thereby progressively urging the said housing and sled to accelerate and move along said track means.

7. In a dynamic testing apparatus for rapidly accelerating a specimen to simulate rapid acceleration or deceleration, the combination of: a frame, a pendulum arm having one end pivotally mounted on said frame for turning in a substantially vertical plane, a weighted member mounted on the other end of said arm, hoist means mounted on said frame for pivoting said arm to raise said weighted member, said hoist means having means for quickly releasing said arm to allow said arm and weighted member to swing downwardly, track means adjacent said frame and having the longitudinal axis parallel to the said plane of turning of said arm, a sled mounted for movement along said track means, said sled for carrying the specimen, impact-transmuting means mounted on said sled and having a plunger for extending into the path of said weighted member upon turning of said arm, said impact-transmuting means having a cylindrical housing for slidably receiving said plunger and with the axis parallel to the said longitudinal axis of said track means, and a plurality of Belleville washers positioned in said housing for resiliently resisting the sliding of said plunger into said housing, whereby when the weighted member and arm is raised and released by said hoist means the said weighted member strikes said plunger urging said plunger into said housing to compress said Belleville washers and with said plunger still engaging said weighted member, the Belleville washers expand to progressively urge said plunger out of said housing thereby progressively urging the said housing and sled to accelerate and move along said track means.

8. As a subcombination for use on a test sled of a dynamic testing apparatus for transmuting an impact force induced by means of the apparatus into a sustaining force for rapidly and relatively uniformly accelerating the sled, the combination of: a cylindrical housing for mounting on the sled, said housing having an open end and a closed end, a cylindrical plunger slidably positioned in said housing and having one end extending through the said open end of said housing for receiving the impact force, and a plurality of spring washers of a generally frustoconical shape positioned in said housing between said closed end and the said plunger, said washers axially aligned with the axis of said housing whereby the impact force to said plunger moves the plunger toward said housing closed end to flatten said washers for absorbing the impact and applying a relatively uniform and sustaining force to said closed end of said housing by the compression and expansion of said washers for accelerating the sled.

9. As a subcombination for use on a test sled of a dynamic testing apparatus for transmuting an impact force induced by means of the apparatus into a sustaining force for rapidly and relatively uniformly accelerating the sled, the combination of: a cylindrical housing for mounting on the sled, said housing having an open end and a closed end, a cylindrical plunger slidably positioned in said housing and having one end extending through the said open end of said housing for receiving said impact force, a plurality of spring washers of a generally frusto-conical shape positioned in said housing between said closed end and the said plunger, said washers axially aligned with the axis of said housing whereby the impact force to said plunger moves the plunger toward said housing closed end to flatten said washers for absorbing the impact and applying a relatively uniform and sustaining force to said closed end of said housing by the compression and expansion of said washers for accelerating the sled, and a plurality of apertures in the said housing for rapid exhaustion and suction of air to the interior of said housing by the movement of said plunger.

10. As a subcombination for use on a test sled of a dynamic testing apparatus for transmuting an impact force induced by means of the apparatus into a sustaining force for rapidly and relatively uniformly accelerating the sled, the combination of: a cylindrical housing for mounting on the sled, said housing having an open end and a closed end, a cylindrical plunger slidably positioned in said housing and having one end extending through the said open end of said housing for receiving said impact force, means cooperating between said plunger and said housing for retaining and guiding said plunger in said housing, a plurality of spring washers of a generally frusto-conical shape positioned in said housing between said closed end and the said plunger, said washers axially aligned with the axis of said housing whereby the impact force to said plunger moves the plunger toward said housing closed end to flatten said washers for absorbing the impact and applying a relatively uniform and sustaining force to said closed end of said housing by the compression and expansion of said washers for accelerating the sled, and a plurality of apertures in the said housing for rapid exhaustion and suction of air to the interior of said housing by the movement of said plunger.

11. As subcombination for use on a test sled of a dynamic testing apparatus for transmuting an impact force induced by means of the apparatus into a sustaining force for rapidly and relatively uniformly accelerating the sled, the combination of: a cylindrical housing having means for mounting said housing on the sled with the axis of said housing parallel to the direction of movement of the sled, said housing having an open end and a closed end, a cylindrical plunger slidably positioned in said housing and having one end extending through the said open end of said housing for receiving said impact force, means cooperating between said plunger and said housing for retaining and guiding said plunger in said housing, a plurality of spring washers of a generally frusto-conical shape positioned in said housing between said closed end and the said plunger, said washers axially aligned with the axis of said housing whereby the impact force to said plunger moves the plunger toward said housing closed end to flatten said washers for absorbing the impact and applying a relatively uniform and sustaining force to said closed end of said housing by the compression and expansion of said washers for accelerating the sled, and a plurality of apertures in the said housing for rapid exhaustion and suction of air to the interior of said housing by the movement of said plunger.

12. In a dynamic testing apparatus for rapidly accelerating a specimen to simulate rapid acceleration or deceleration, the combination of: a frame, a pendulum arm having one end pivotally mounted on said frame for turning in a substantially vertical plane, a weighted member mounted on the other end of said arm, means for raising and releasing said arm to allow said arm and weighted member to swing downwardly, track means adjacent said frame and having the longitudinal axis parallel to the said plane of turning of said arm, a sled for carrying the specimen, means for mounting said sled on said track means for rolling movement along said track means upon acceleration of said sled and frictional engagement with said track means upon deceleration of said sled, impact-transmuting means mounted on said sled for positioning in the path of said weighted member upon turning of said arm, said impact-transmuting means having means for converting the impact force generated by the striking of said pendulum member into a relatively sustaining force for accelerating the said sled and specimen along said track.

13. In a dynamic testing apparatus for rapidly accelerating a specimen to simulate rapid acceleration or deceleration, the combination of: a frame, a pendulum arm having one end pivotally mounted on said frame for turning in a substantially vertical plane, a weighted member mounted on the other end of said, arm means for raising and releasing said arm to allow said arm and weighted member to swing downwardly, track means adjacent said frame and having the longitudinal axis parallel to the said plane of turning of said arm, a sled mounted for movement along said track means, said sled for carrying the specimen, impact-transmuting means mounted on said sled for positioning in the path of said weighted member upon turning of said arm, said impact-transmuting means having means for converting the impact force generated by the striking by said pendulum member into a relatively sustaining force for accelerating the said sled and specimen along said track, and means for causing progressively greater deceleration of said sled as the sled proceeds along said track means subsequent to the acceleration comprising a chain having a mid-portion extending across said track means for engaging said sled and having end portions extending along said track means in the direction of travel of said sled whereby said sled engages said chain and progressively drags more chain along said track means as said sled moves along said track means.

14. In a dynamic testing apparatus for rapidly accelerating a specimen to simulate rapid acceleration or deceleration, the combination of: a frame, a pendulum arm having one end pivotally mounted on said frame for turning in a substantially vertical plane, a weighted member mounted on the other end of said arm, means for raising and releasing said arm to allow said arm and weighted member to swing downwardly, track means adjacent said frame and having the longitudinal axis parallel to the said plane of turning of said arm, a sled for carying the specimen, means for mounting said sled on said track means for rolling movement along said track means upon acceleration of said sled and frictional engagement with said track means upon deceleration of said sled, impact-transmuting means mounted on said sled for positioning in the path of said weighted member upon turning of said arm, said impact-transmuting means having means for converting the impace force generated by the striking of said pendulum member into a relatively sustaining force for accelerating the said sled and specimen along said track, and means for causing progressively greater deceleration of said sled as the sled proceeds along said track means subsequent to the acceleration comprising a chain having a mid-portion extending across said track means for engaging said sled and having end portions extending along said track means in the direction of travel of said sled whereby said sled engages said chain and progressively drags more chain along said track means as said sled moves along said track means.

15. In a dynamic testing apparatus for rapidly accelerating a specimen to be tested, the combination of: a frame, a pendulum member pivotally mounted on said frame, means for pivotally raising and releasing said pendulum member, a sled for mounting the specimen, a track for carrying said sled, means for mounting said sled on said track for rolling movement along said track upon acceleration of said sled in one direction and for frictional engagement with said track upon deceleration of said sled in that direction, impact-transmuting means mounted on said sled for positioning in the path of said pendulum member whereby said pendulum strikes said impact-transmuting means upon release, said impact-transmuting means having means for converting the impact force generated by the striking by said pendulum member into a relatively sustaining force for accelerating the said sled and specimen along said track.

16. In a dynamic testing apparatus for rapidly accelerating a specimen to be tested, the combination of: a frame, a pendulum member pivotally mounted on said frame, means for pivotally raising and releasing said pendulum member, a sled for mounting the specimen, a track for carrying said sled, impact-transmuting means mounted on said sled for positioning in the path of said pendulum member whereby said pendulum strikes said impact-transmuting means upon release, said impact-transmuting means having means for converting the impact force generated by the striking by said pendulum member into a relatively sustaining force for accelerating the said sled and specimen along said track, said sled having a leading end and a trailing end with respect to the direction of movement along said track, separate mounting means on each said end of the sled for engaging said track, said track having upwardly and downwardly facing surfaces, said mounting means on the leading end of the sled having rollers for engaging said downwardly facing track surface and frictional means for engaging said upwardly facing track surface, said mounting means on the trailing end of the sled having rollers for engaging said upwardly facing track surface and frictional means for engaging said downwardly facing track surface, whereby said rollers of both mounting means engage said track during acceleration of said sled and said frictional means engage said track during deceleration of said sled.

17. As a subcombination for use on a test sled of a dynamic testing apparatus for mounting the sled on a track along which the sled is to be accelerated, the combination of: separate mounting means on the leading and trailing ends of the sled with respect to the direction of movement of the sled along the track, said mounting means for engaging the track and mounting the sled on the track, said mounting means on the leading end of the sled having rollers for engaging a downwardly facing surface of the track and frictional means for engaging an upwardly facing surface of the track, said mounting means on the trailing end of the sled having rollers for engaging the upwardly facing surface of the track and frictional means for engaging the downwardly facing surface of the track, whereby said rollers of both mounting means engage said track during acceleration of said sled and said frictional means of both mounting means engage said track during deceleration of said sled.

18. In a dynamic testing apparatus for rapidly accelerating a specimen to be tested, the combination of: a frame, a pendulum member pivotally mounted on said frame, means for pivotally raising and releasing said pendulum member, a sled for mounting the specimen, a track for carrying said sled, impact-transmuting means mounted on said sled for positioning in the path of said pendulum member, whereby said pendulum strikes said impact-transmuting means upon release, said impact-transmuting means having means for converting the impact force generated by the striking by said pendulum member into a relatively sustaining force for accelerating the said sled and specimen along said track, and means for causing progressively greater deceleration of said sled as the sled proceeds along said track subsequent to the acceleration comprising a heavy flexible member of substantial length having a mid portion extending across said track for engaging said sled and having end portions extending along said track in the direction of travel of said sled whereby said sled engages said flexible member and progressively drags more of said flexible member along said track as said sled moves along said track.

19. As a subcombination for use with a test sled mounted on a track of a dynamic testing apparatus for causing deceleration of the sled after the test acceleration has been imposed, comprising: a heavy flexible member of substantial length, said flexible member having a mid portion and two end portions, said mid portion of the flexible member extending across the track in the path of the sled for engaging the sled, said two end portions extending along the track in the direction of travel of the sled whereby the sled engages the mid portion of the flexible member for carrying the flexible member along the track and progressively drags more of the two end portions of the flexible member along the track as the sled moves along the track.

References Cited by the Examiner

UNITED STATES PATENTS

| | | | |
|---|---|---|---|
| 2,083,805 | 6/37 | Adams | 244—63 |
| 2,518,350 | 8/50 | McCormick | 73—12 |
| 2,701,963 | 2/55 | Balleisen et al. | 73—11 X |
| 2,724,966 | 11/55 | Northrop et al. | 73—147 |

RICHARD C. QUEISSER, *Primary Examiner.*

DAVID SCHONBERG, *Examiner.*